United States Patent

[11] 3,592,157

| [72] | Inventor | Robert I. Schwartz<br>87-73 Kingston Place, Jamaica Estates,<br>N.Y. 11432 |
| --- | --- | --- |
| [21] | Appl. No. | 813,244 |
| [22] | Filed | Apr. 3, 1969 |
| [45] | Patented | July 13, 1971 |

[54] ILLUMINATED BALLOON
6 Claims, 4 Drawing Figs.

[52] U.S. Cl. ................. 116/124 B,
9/9, 240/10 C
[51] Int. Cl. ................. F21p 1/02,
F21l 15/08
[50] Field of Search ................. 240/10;
116/124.9; 46/90, 87, 9/9; 141/329

[56] References Cited
UNITED STATES PATENTS

| 2,383,390 | 8/1945 | Jacobs | 116/124.9 |
| --- | --- | --- | --- |
| 2,477,899 | 8/1949 | Rempel | 46/90 |
| 3,007,483 | 11/1961 | Keefe | 116/124.9 |
| 3,118,672 | 1/1964 | Dorn | 46/90 |
| 3,174,455 | 3/1965 | Peterson | 116/124.9 |
| 3,229,817 | 1/1966 | Smith | 73/170 |
| 3,253,573 | 5/1966 | Ashline | 116/124.9 |
| 3,310,024 | 3/1967 | McConnel | 116/124.9 |
| 3,363,350 | 1/1968 | Moran | 46/88 |

FOREIGN PATENTS

| 525,715 | 5/1930 | Germany | 116/124.9 |
| --- | --- | --- | --- |

*Primary Examiner*—Louis R. Prince
*Assistant Examiner*—Denis E. Corr
*Attorney*—Michael Ebert ABSTRACT: An illuminated balloon adapted to function as a signal beacon or as a display device, the balloon being constituted by an inflatable bag of translucent material having a spout. Inserted in the spout to hermetically seal the bag is a stopper having a self-sealing plug portion to receive a hypodermic needle for injecting a lighter-than-air gas into the bag in order to inflate it to its full dimensions. Disposed within the bag at the end of a pair of stiff leads and connected thereto is an electrical light bulb, the leads extending through the stopper to external terminals. A battery serving as an anchor for the floating balloon is connected to the terminals by means of a flexible cable acting also to tether the balloon.

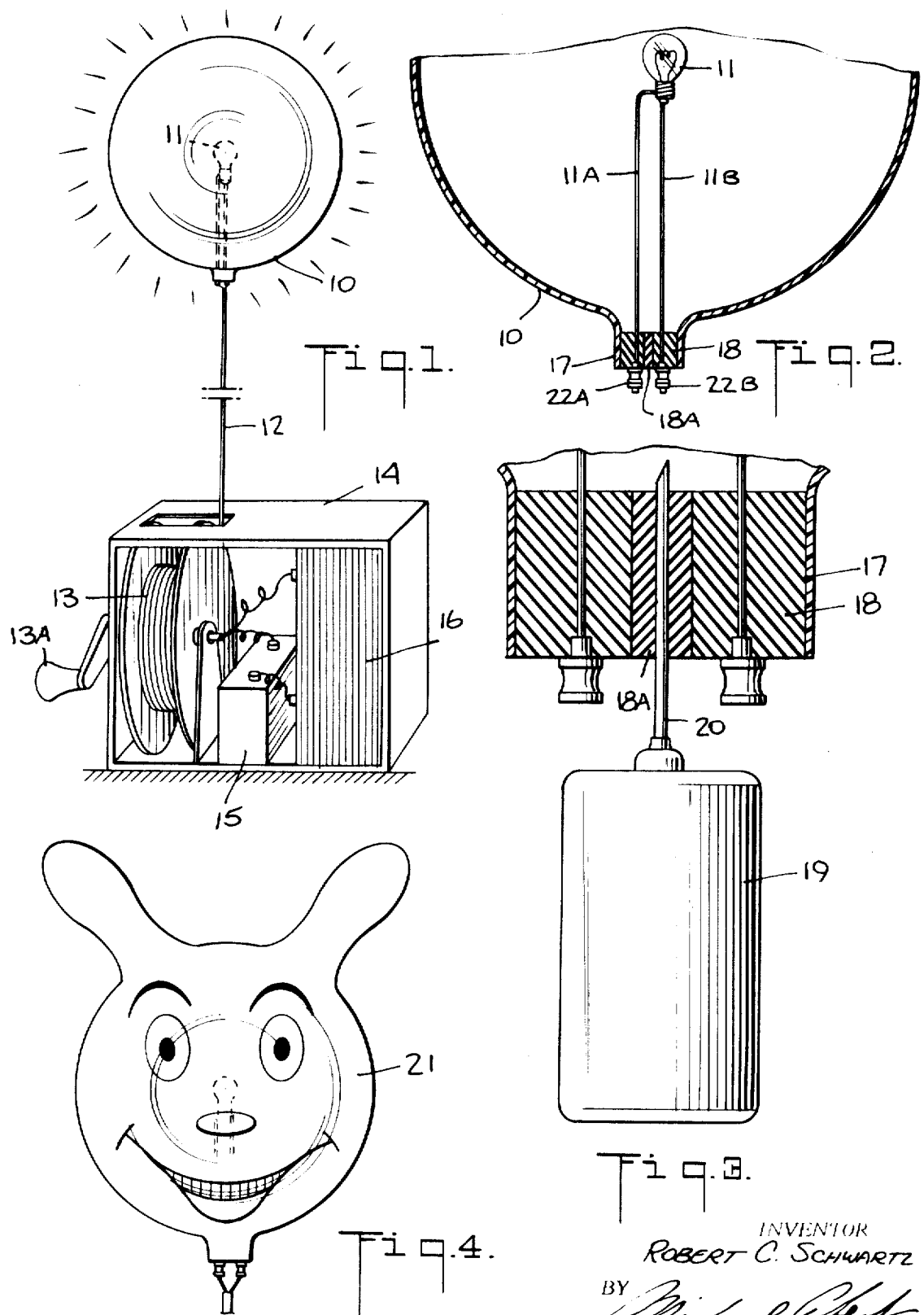

ILLUMINATED BALLOON

This invention relates generally to inflatable balloons, and more particularly to an illuminated balloon capable of functioning as a signal beacon, or as a display device or toy.

There are many emergency situations in which an illuminated beacon is useful for purposes of locating the site of a person or vessel in distress, and for attracting assistance. Thus when passengers on a shipwrecked vessel are compelled to occupy a lifeboat on the open sea, it is essential that they have some signaling means for attracting assistance, particularly at night.

The fact that the vessel has been shipwrecked may have been transmitted by ship radio to a shore station, but rescue planes or helicopters heading toward the general area of the vessel usually experience great difficulty in locating a small life boat on the open sea. The visibility of such boats is generally poor, especially in bad weather.

Life boats may be equipped with emergency radio equipment, but such equipment is of no value to a rescue plane or helicopter in search of the boat, unless the plane has a radio direction-finding system, which is often not the case. But even with radio direction finding equipment, in order to find the exact site of transmission, a triangulation technique is essential, requiring two well-separated radio direction finding systems. This is not possible on a single rescue plane for a radio direction finder will only point to the angular direction from which a transmission emanates, not to the exact side thereof.

Alternatively, the life boat may use rocket-type flares for calling attention to its location, but such flares have a brief life, and if not seen by the rescue mission when they are active, the flares are of no use. While a lifeboat may be provided with lights, these are of limited value when the lights are at the level of the boat, for they may be obscured by waves, low lying clouds and other factors.

Accordingly, it is the main object of this invention to provide an inflatable illuminated balloon of translucent material which is capable of being elevated to a highly visible position, the balloon acting as a signal beacon.

More specifically, it is an object of this invention to provide a balloon which includes an electric light bulb therein, the bulb being energized by current fed through a tethering cable from a ground battery serving to anchor the balloon.

A significant aspect of the invention is that the balloon is formed of a bag having a spout into which a stopper is inserted which permanently seals the bag, inflation being effected by injecting gas through the stopper. In this way, in emergency circumstances, the user does not have the problem of knotting the spout or otherwise sealing the bag after inflation, thereby obviating the possibility of gas leakage from the balloon. The invention is of course not restricted to use in life boats and is applicable to any situation calling for a signal beacon.

Briefly stated, these objects are accomplished in a balloon having a bag formed of flexible but nonstretchable translucent material so that the inflated dimensions of the bag are predetermined. The bag is provided with a spout into which is permanently inserted a stopper having a self-sealing plug portion for receiving an injection needle through which a lighter-than-air gas may be introduced to inflate the bag to full size.

Disposed within the bag at the end of a pair of relatively stiff conductive leads and connected thereto is a light bulb, the leads extending through the stopper to provide external terminals. A battery serving to anchor the balloon as well as to power the bulb is connected to the terminals by means of a flexible, lightweight cable serving as a tethering line by which the balloon may be elevated to a desired height.

While the invention will be described mainly in respect to its use as a signal beacon, it will be appreciated that its use is not so limited, for the balloon may be used as an inflated and illuminated lampoon or for other display or toy purposes wherein the bag has an ornamental configuration.

For a better understanding of the invention as well as other objects and further features thereof, reference is made to the following detailed description to be read in conjunction with the accompanying drawing, wherein:

FIG. 1 shows a signal beacon in accordance with the invention;

FIG. 2 illustrates the interior of the balloon, in section;

FIG. 3 shows the manner of inflating the balloon with gas; and

FIG. 4 shows another embodiment of the invention in which the balloon serves a decorated purpose.

Referring now to the drawings, and more particularly to FIG. 1, there is shown a signal beacon assembly in accordance with the invention, the beacon assembly being constituted by a balloon, generally designated by numeral 10, having an electric light bulb 11 therein to illuminate the balloon and to thereby assist in locating its site. The balloon is inflated with a lighter-than-air gas, preferably helium, the balloon floating in the atmosphere at a height determined by the length of a tethering line or cable 12 which is formed of a pair of fine, flexible wire which are sufficiently lightweight to avoid a substantial drag on the balloon.

The cable terminates in a reel 13 contained in a battery box 14, the cable being played out by a handcrank 13A, so that the balloon may be raised to any desired elevation within the limits of the tethering line. The cable serves to conduct current to the lamp 10 from a suitable battery 15. An interrupter switch 16 may be interposed between the battery and the line to periodically switch on the current and thereby provide a flashing light, as is sometimes desirable in attracting attention.

In the simplest form of the beacon assembly, one may dispense with the reel and interrupter and connect the end of a cable of suitable length directly to a battery, a hand-operated generator or other suitable voltage source.

As best seen in FIGS. 2 and 3, balloon 10 is provided with a spout 17. The balloon is fabricated of a flexible translucent material such as nylon, polypropylene, Mylar or other high-strength, pore-free film material which preferably is nonstretchable so that the inflated size of the balloon is predetermined. The balloon may in some instances be made of conventional rubber, particularly where its intended use is merely decorative.

Inserted in spout 17 is a stopper 18 which may be formed of vulcanized rubber or other suitable material capable of effectively sealing the balloon, the periphery of the stopper being cemented or otherwise bonded to the spout to ensure a hermetic seal. The central area of the stopper 18 has a plug portion 18A which may be formed of unvulcanized rubber or other viscous material having self-sealing characteristics, such as those now in use in automotive tires to self-seal the tire wall after a nail or other puncture-producing object is removed therefrom. Bulb 11 is supported within the balloon by a pair of relatively stiff wires 11A and 11B, one end of these wires being connected to the bulb, the other end extending through stopper 28 and being connected to terminals 22A and 22B.

To inflate the bag 10, a cartridge 19, such as that shown in FIG. 3, containing a pressurized charge of helium or other suitable lighter-than-air gas may be used in conjunction with a hypodermic needle 20 adapted to penetrate the plug portion 18A of the stopper. In practice, the needle may have a breakable tip adapted to seal the cartridge, the tip being broken off just before the needle is injected. Or the cartridge may be provided with a gas-release valve, the cartridge being used with a replaceable needle which may be removed when the cartridge is exhausted and coupled to a fresh cartridge. Alternatively the cartridge may be a one-shot disposable unit carrying only sufficient gas for a single inflation.

In all events, the plug 18A acts effectively as a unidirectional valve to admit gas into the bag and to prevent exhaust therefrom. In place of this plug, one may incorporate into the stopper a unidirectional valve structure of the type used in standard butane-type cigarette lighters operating in conjunction with recharge cartridges.

When the beacon is intended mainly for aircraft observation, one may coat the lower portion of the bag with a highly reflective metal deposit such as aluminum, as by vacuum deposition techniques, thereby forming a concave reflector concentrating the light from the lamp upwardly to form a highly visible beam which is readily detected.

In FIG. 4, the bag is vacuum molded or otherwise shaped into a decorative form which may be a lampoonlike FIG., an animal head or other decorative or playful configuration. Thus bag 21 is an animallike form which is internally illuminated, the surface of the bag being printed to create eyes and other animal head elements.

Another important use of the illuminated balloon is as a warning beacon for automobiles and trucks in distress. In New York State, the Department of Motor Vehicles has recommended the use of air-inflated colored balloons attached to the radio aerial or elsewhere on a disabled vehicle to signal the need for assistance, a red balloon indicating one condition, a green balloon another. With the present invention, a much more effective signal is provided, especially at night where only an illuminated balloon would be visible on a dark road.

Moreover, with a balloon, in accordance with the invention, filled with lighter-than-air gas and with the end of the cable terminating in a plug insertable in the cigarette-lighter socket of the vehicle, one may then power the balloon bulb from the battery of the vehicle. For trucks or other vehicles lacking a cigarette-lighter socket, alligator-type clips may be provided at the end of the cable for direct connection to the vehicle storage battery. In either case, the balloon is well elevated above the vehicle for a much higher degree of visibility.

While there have been shown preferred embodiments of the invention, it is to be understood that many modifications and changes may be made therein without departing from the essential spirit of the invention.

I claim:

1. An illuminated balloon assembly comprising:
   a. a bag capable of containing gas and formed of flexible, translucent material, said bag having an inlet spout,
   b. a stopper inserted in said spout and sealed thereto, said stopper being constituted by a relatively rigid gas-impermeable section and a plug section formed of self-sealing material extending between the ends of the stopper and adapted to receive a hypodermic needle to inject a lighter-than-air gas into the bag to inflate same,
   c. an electric light bulb disposed within said bag,
   d. a pair of relatively stiff, electrically conductive leads supporting said bulb at one end and connected thereto, the other end of said leads being secured by and extending through the impermeable section of said stopper to connecting terminals,
   e. a voltage source for anchoring said balloon and energizing said bulb, and
   f. a flexible cable formed by a pair of fine, lightweight wire connecting said source to said terminals and tethering said balloon.

2. An assembly as set forth in claim 1, wherein said bag material is a nonstretchable plastic film.

3. An assembly as set forth in claim 1, wherein said bag is spheroidal, the lower portion thereof having a reflective, metallized coating thereto to form a concave reflector producing an upwardly directed light beam.

4. An assembly as set forth in claim 1, wherein said source is a battery operating in conjunction with an interrupter to provide a flashing light.

5. An assembly as set forth in claim 1, wherein said bag is shaped to define a lampoonlike FIG.

6. An assembly as set forth in claim 1, wherein said cable is wound on a hand-operated reel and may be more or less played out to elevate said balloon to a desired height.